May 12, 1964 E. M. PELL 3,132,408

METHOD OF MAKING SEMICONDUCTOR STRAIN SENSITIVE DEVICES

Filed Jan. 18, 1962

Inventor:
Erik M. Pell,
by Joseph V. Claeys
His Attorney.

United States Patent Office 3,132,408
Patented May 12, 1964

3,132,408

METHOD OF MAKING SEMICONDUCTOR STRAIN SENSITIVE DEVICES

Erik M. Pell, Webster, N.Y., assignor to General Electric Company, a corporation of New York Filed Jan. 18, 1962, Ser. No. 167,112
4 Claims. (Cl. 29—25.35)

This invention relates in general to semiconductor strain sensitive devices and in particular to a method of making such devices having improved characteristics.

Semiconductor strain sensitive elements are known in the prior art which comprise two strips of semiconductive material insulated from each other and cemented together. When the unit is deformed, as by bending or the like, one of the strips is loaded in compression and the other strip is loaded in tension. Under this condition, due to the piezoresistance effect of the semiconductive material, the resistance of one strip increases while the resistance of the other strip decreases. Since the two strips are insulated from each other this effect may be utilized to measure the strain by connecting the unit so as to provide two resistance arms of a bridge circuit. The unbalance of the bridge is then detected to give an indication of the strain in a well-known manner.

While such semiconductor-type elements ordinarily have a much greater sensitivity than other more conventional elements, such as resistance wires or the like, they have not been entirely satisfactory in that various difficulties are often encountered in cementing the two semiconductor strips together which results in some loss in sensitivity.

It is an object of this invention, therefore, to provide a method of making semiconductor strain sensitive devices of the above general type which substantially avoids one or more of the prior art difficulties and which is capable of producing a device having greater sensitivity than heretofore possible.

It is another object of this invention to provide a simple and trouble free method of providing isolation between the compression and tension sides of a semiconductor strain sensitive device of the above type.

It is a further object of this invention to provide a simplified method of making a semiconductor strain sensitive device having a desired impedance, temperature stability, and sensitivity.

Briefly stated, in accordance with one aspect of this invention, an improved semiconductor strain sensitive device is fabricated from a body of low resistivity semiconductive material. The body is converted to high resistivity throughout and thereafter only the surface adjacent regions of the body are reconverted to low resistivity material. The low resistivity surface adjacent regions so formed are removed from any two opposite surfaces of the body to form a device having two low resistivity surface adjacent regions separated by a region of high resistivity.

Figure 1:
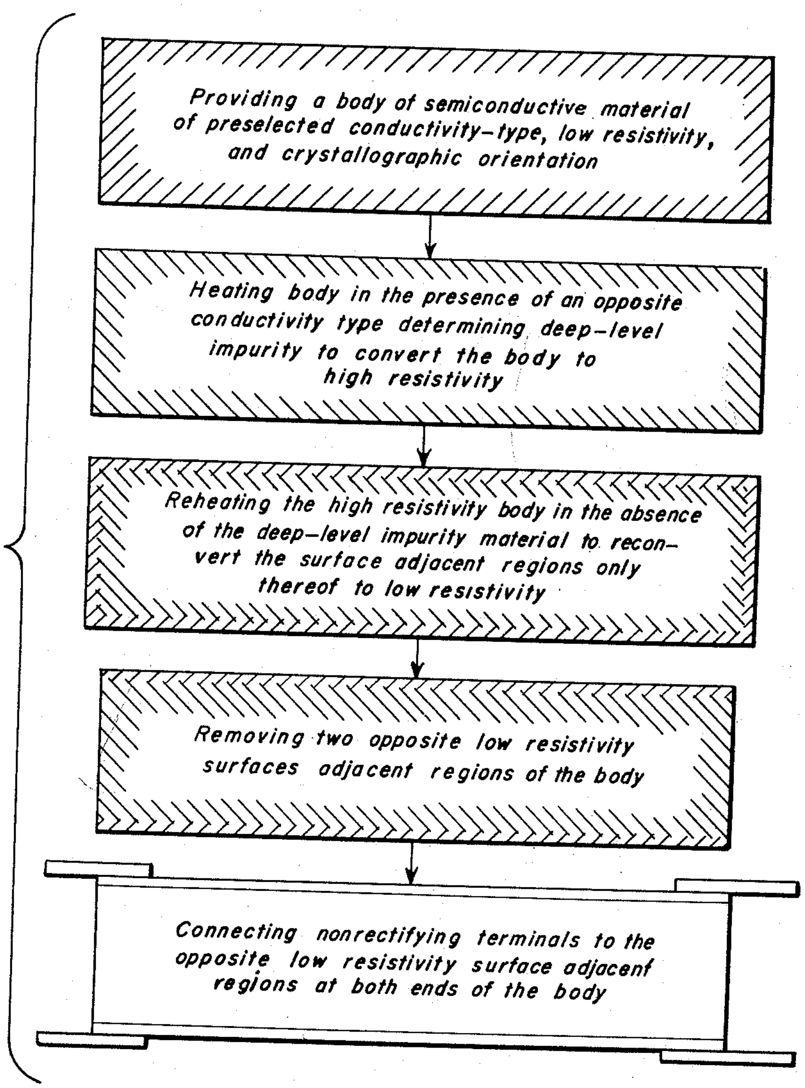
Figure 2:
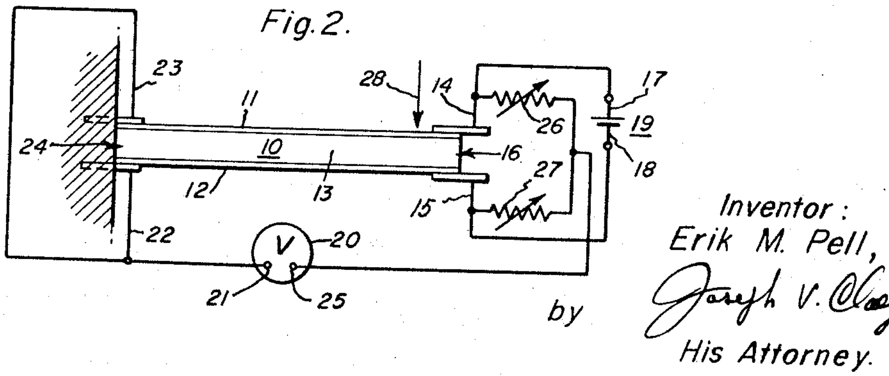

The novel features believed characteristic of this invention are set forth with particularity in the appended claims. The invention itself, however, both as to its organization and method of operation, together with further objects and advantages thereof, may best be understood by reference to the following description taken in conjunction with the accompanying drawing in which:

FIGURE 1 is a flow diagram which illustrates the various stages in the fabrication of a semiconductor strain sensitive device in accordance with the method of this invention; and, FIGURE 2 is a diagrammatic illustration of such a strain sensitive device connected in a suitable electrical circuit arrangement for measuring strain.

A semiconductor body, having a desired resistivity, conductivity-type, and crystallographic orientation may be operated upon, in accordance with a preferred embodiment of the method of this invention, to provide a semiconductor strain sensitive device having improved characteristics. For simplicity of explanation, the method of this invention will be described in detail with reference to an example wherein the body is of N-type conductivity, low resistivity silicon semiconductive material. It will be understood, however, that this invention is applicable to any other semiconductive materials, such as gallium arsenide and the like, into which impurities may be introduced at deep-levels to provide a high resistivity material, preferably greater than about $10^3$ ohm centimeters at room temperature.

It is often desirable to utilize as low a resistivity starting material as possible. Since the solubility of the deep-level impurity in the particular semiconductive material utilized determines the highest resistivity to which the material may be converted, however, the low resistivity limit depends to a great extent upon the semiconductive material utilized and the solubility of the deep-level impurity therein. For example, silicon, having a room temperature resistivity as low as about 0.1 ohm centimeters, may be converted, utilizing gold as the deep-level impurity, to a resistivity of about $10^4$ ohm centimeters. Other semiconductive materials, having a room temperature resistivity as low as 0.001 ohm centimeters, may achieve a similar high resistivity utilizing an appropriate deep-level impurity. For purposes of this invention, however, it is only necessary that the semiconductive material utilized should be capable of achieving a sufficiently high, deep-level induced room temperature resistivity so that the ratio of the resistivity of the high resistivity material to the low resistivity surface adjacent regions thereof is greater than about 100.

In FIGURE 1 an elongated body of N-type conductivity silicon, having a crystallographic orientation in the <110> direction and a bulk resistivity at room temperature of less than about 10 ohm centimeters, and preferably less than about 0.1 ohm centimeters, is converted to P-type conductivity material having a bulk resistivity at room temperature greater than about $10^3$ ohm centimeters. This conversion may be accomplished by indiffusing an opposite conductivity type determining, deep-level impurity into the body by heating the body in the presence thereof for a time sufficient to achieve the required high resistivity. Some examples of deep-level impurities are: the transition metals such as manganese, iron, cobalt and nickel; members of the copper group such as copper, silver and gold; and members of the zinc group such as zinc, cadmium and mercury. Gold is a particularly suitable deep-level impurity for silicon. In this example, therefore, a layer of gold of about 1 micron in thickness is deposited on both broad surfaces of the body, as by evaporation in vacuo, and the body thereafter heated to a temperature of about 1200° C. for about four days to cause the gold to diffuse into the silicon body to render it of opposite conductivity-type and increase the resistivity thereof to a value of approximately $10^5$ ohm centimeters.

To achieve optimum temperature stability, the compression and tension sides of the strain sensitive device should be highly impregnated with an appropriate conductivity determining impurity. As a result, material having the desired temperature stability is of low resistivity. At the same time, to achieve a device which exhibits optimum electrical characteristics the resistance of the compression and tension sides should be relatively high.

In accordance with this invention the desired temperature stability and electrical characteristics are achieved by providing extremely thin low resistivity surface adjacent regions for the compression and tension sides of the device respectively. Preferably, such low resistivity regions have a thickness in the range of about 10 to 100 microns and a resistivity less than about 10 ohm centimeters.

To this end, in accordance with the method of this invention, the surface adjacent regions of the body, preferably only to a thickness in the range of about 10 to 100 microns, are converted to low resistivity. This may be conveniently accomplished by outdiffusion of the deep-level impurity from only these regions, as by reheating in the absence of the deep-level impurity. For example, the remaining gold is removed from the surfaces of the body, as by etching, grinding or the like and the body reheated to a temperature and for a time sufficient to reconvert the surface adjacent regions thereof to approximately the resistivity of the original body. To provide low resistivity surface adjacent regions having a thickness of about 100 microns, for example, the body may be reheated to a temperature of about 800° C. for about one hour. Further details for calculating diffusion times and temperatures may be had by reference to the data of Struthers, in the Journal of Applied Physics, vol. 27, p. 1560 (1956) and vol. 28, p. 516 (1957).

The method of this invention is particularly important in this respect since the temperature stability of the piezoresistance coefficient is usually very much better for a more heavily impregnated, lower resistivity material than for a less heavily impregnated, higher resistivity material so that a desired stable, high quality, high impedance device can not be obtained by merely providing high resistivity material for the tension and compression sides thereof.

After conversion of the surface adjacent regions of the body to their original low resistivity value, two of the regions on opposite surfaces of the body are removed such as by grinding, etching, or the like, to provide a device, in the form of a sandwich, wherein two low resistivity surface adjacent regions are separated by a very high resistivity region. For example, as shown by the foregoing description, a particular device may have two opposite surface adjacent regions with a resistivity of about 0.1 ohm centimeters at room temperature and of N-type conductivity separated by a region of P-type conductivity material with a room temperature resistivity of about $10^4$ ohm centimeters. Preferably, the semiconductive material chosen should be capable of achieving a sufficiently high resistivity by deep-level impurity diffusion that the ratio of the resistivity of such material to the resistivity of the low resistivity surface adjacent regions thereof is greater than about 100.

Nonrectifying terminals are provided as by soldering, cementing, plating or the like, to the opposite low resistivity surface adjacent regions at the respective ends of the device.

The crystallographic orientation of the body with respect to the longest dimension thereof is selected to provide a large longitudinal piezoresistance coefficient. For example, an examination of the piezoresistance coefficients shows that some materials have one large coefficient, some have two large coefficients, some have coefficients which are positive, and some have coefficients which are negative. As used throughout the specification and appended claims, the piezoresistance, and the related elastoresistance, coefficients are termed "longitudinal" or "transverse" depending upon whether strain and resistance are measured parallel with, or mutually perpendicular to, each other respectively.

For a strain sensitive device of the type referred to in the present example of this invention, the strain and resistance are measured parallel with each other so that the change in resistance in the two strain sensitive portions of the device is determined essentially by the longitudinal piezoresistance coefficient. Thus, the longest dimension of the semiconductor body is selected, with respect to the semiconductive material of which it is composed and its rsistivity and conductivity-type, to provide as large a longitudinal piezoresistance coefficient as possible. Although calculation shows that the largest longitudinal piezoresistance coefficient for silicon is in the <111> direction, N-type conductivity silicon also has a large longitudinal, as well as a large transverse, piezoresistance coefficient in the <100> direction, so that there is a great deal of freedom to choose the particular orientation and conductivity-type to obtain a device having a desired sensitivity, impedance level, and linear range of response.

In FIGURE 2 there is illustrated, in diagrammatic form, a suitable electrical circuit arrangement wherein a strain sensitive device fabricated in accordance with the method of this invention is employed to provide two resistance arms of a bridge-type measuring circuit.

A semiconductor strain sensitive device 10 includes low resistivity surface adjacent regions 11 and 12 disposed on the opposite surface adjacent regions of, and separated by, a very high resistivity region 13. Terminals 14 and 15, connected to the opposite low resistivity regions 11 and 12 at the end 16, are connected to the respective terminals 17 and 18 of a suitable voltage supply, shown schematically as battery 19. An appropriate detecting means 20, such as a galvanometer, voltmeter, or the like has one terminal 21 connected in common to the terminals 22 and 23 which are connected respectively to the opposite low resistivity surface adjacent regions 12 and 11 at the other end 24 of device 10. The other terminal 25, of detecting means 20, is connected to the common junction of resistors 26 and 27. The other ends of resistors 26 and 27 are connected respectively to the terminals 14 and 15, thereby forming a bridge-type measuring circuit wherein resistances 26 and 27 comprise two resistance arms, and low resistivity regions 11 and 12 of strain sensitive device 10 comprise the other two resistance arms thereof.

In operation, one end 24 is rigidly secured so that when a force, as shown by the arrow 28 is applied, the device 10 is caused to deform, loading the low resistivity region 11 in tension and the low resistivity region 12 in compression. As shown by the foregoing description, such a condition results in an increase in resistance in one of the low resistivity regions and a decrease in resistance in the opposite low resistivity region. This change in resistance causes an unbalance of the bridge circuit which is measured by detecting means 20 to determine the amount of strain in a well-known manner.

Although in the foregoing detailed description of the preferred embodiment of the method of this invention the N-type conductivity body of silicon was converted to opposite conductivity type, it will be understood by those skilled in the art that such a change in conductivity-type is not necessary to this invention. For purposes of the foregoing described invention, therefore, it should be understood that the indiffusion and outdiffusion steps are operative to produce high and low resistivity regions respectively whether the conductivity-type be the same or different. For example, depending upon the level of the selected deep-level impurity in a particular semiconductive material the conductivity-type may or may not change by such indiffusion although the desired high resistivity is achieved in any event.

The device constructed in accordance with the above described method of this invention, therefore, may utilize very low resistivity material for the tension and compression sides, to achieve optimum temperature stability properties, and yet, since the thickness of the low resistivity surface adjacent regions may be so readily controlled, a wide range of impedance values may be provided. Further, the device so constructed has increased sensitivity, since the tension and compression members are disposed at the very outer portions of the device where they exhibit a greater deformation for any given force.

While the invention has been described in detail herein with reference to a specific example by way of illustration, many changes and modifications will occur to those skilled in the art. It is, therefore, to be understood that the appended claims are intended to cover all such changes and modifications as fall within the true spirit and scope of the invention.

What I claim as new and desire to secure by Letters Patent of the United States is:

1. The method of fabricating a semiconductive strain sensitive device, which method comprises:

(*a*) heating a low resistivity monocrystalline semiconductive material body in the presence of a deep-level impurity therefor for a time sufficient to effect substantial diffusion of said impurity into said body;

(*b*) removing all of said impurity external to said body from the presence of said body;

(*c*) heating said body in the external absence of said impurity for a time sufficient to effect diffusion of said impurity out from only the surface-adjacent regions of said body to provide surface-adjacent regions depleted of said impurity;

(*d*) removing all but two opposed, impurity-depleted surface-adjacent regions; and (*e*) attaching non-rectifying contacts to respective ends of the two remaining impurity-depleted surface-adjacent regions.

2. The method of claim 1 wherein the bulk resistivity of said low resistivity semiconductive material is selected to be less than about 10 ohm centimeters and said deep-level impurity is selected to provide a bulk resistivity, for portions of said body having said impurity diffused therein, greater than $10^3$ ohm centimeters.

3. The method of claim 2 wherein said heating in the external absence of said impurity is continued for a time sufficient to provide impurity-depleted surface-adjacent regions having a thickness in the range of about 10 to 100 microns.

4. The method of fabricating a semiconductor strain sensitive device, which method comprises:

(*a*) heating an N-type conductivity, silicon semiconductor material body, having a crystallographic orientation in the <111> direction and a room temperature bulk resistivity less than about 10 ohm centimeters, in the presence of gold for a time sufficient to produce a room temperature bulk resistivity therein greater than about $10^3$ ohm centimeters;

(*b*) removing all of said gold external to said body from the presence of said body;

(*c*) heating said body in the external absence of gold for a time sufficient to produce surface-adjecent regions in said body having a thickness in the range of about 10 to 100 microns, said regions being depleted of gold and having a resistivity less than about 10 ohm centimeters;

(*d*) removing all but two opposed, depleted surface-adjacent regions; and (*e*) attaching non-rectifying contacts to respective ends of the two remaining depleted surface-adjacent regions.

References Cited in the file of this patent

UNITED STATES PATENTS

| | | |
|---|---|---|
| 2,771,382 | Fuller | Nov. 20, 1956 |
| 2,964,689 | Buschert et al. | Dec. 13, 1960 |
| 3,049,685 | Wright | Aug. 14, 1962 |